(12) United States Patent
Barlow et al.

(10) Patent No.: US 6,232,988 B1
(45) Date of Patent: May 15, 2001

(54) SYSTEMS AND METHODS FOR CONVERTING A COMPONENT IN AN ANIMATION TO AN INTERACTIVE OBJECT

(75) Inventors: Steven Barlow, Newton; Lawrence B. Kyrala, Watertown, both of MA (US)

(73) Assignee: ThingWorld.Com, LLC, Watertown, MA (US)

( * ) Notice: Subject to any disclaimer, the term of this patent is extended or adjusted under 35 U.S.C. 154(b) by 0 days.

(21) Appl. No.: 09/063,509

(22) Filed: Apr. 21, 1998

(51) Int. Cl.[7] ............................................. G06T 15/00
(52) U.S. Cl. .......................................................... 345/473
(58) Field of Search ..................................... 345/472, 473, 345/418, 419, 474, 302

(56) References Cited

U.S. PATENT DOCUMENTS 5,572,651 * 11/1996 Weber et al. ......................... 345/473
5,892,507 * 4/1999 Moorby et al. ....................... 345/473

* cited by examiner

*Primary Examiner*—Cliff N. Vo
(74) *Attorney, Agent, or Firm*—Testa, Hurwitz & Thibeault, LLP (57) ABSTRACT

A conversion system for converting one or more components of a time-based component media (TBCM) to one or more interactive objects. In one embodiment, a conversion controller converts components in selected frames in the TBCM to bitmaps stored in an object data structure of an interactive object. The components can then be viewed and modified as separate animated graphic objects independently of the original TBCM.

21 Claims, 8 Drawing Sheets

SYSTEMS AND METHODS FOR CONVERTING A COMPONENT IN AN ANIMATION TO AN INTERACTIVE OBJECT

FIELD OF THE INVENTION

The invention relates to systems and methods for creating objects for use on a computer system, and, more particularly, to conversion systems that produce objects for display and manipulation by an end user of the computer system.

BACKGROUND OF THE INVENTION

Animations historically have been based on a rapidly displayed series of drawings or images, which produce the appearance of one image or scene changing or moving. The simplest approach involves thumbing through a stack of drawings, which can produce a simple animation effect lasting a second or two. Animations have long been produced as film-based movies, such as cartoons based on a sequence of drawings, which are captured as frames on the film. Generally, an animation can be termed a time-based media, in which a series of frames are displayed in sequence over a period of time, resulting in the animated effect of one moving image. The time allowed for the display of each separate frame is critical in determining the rate of display, thus affecting the speed with which the animated image or scene appears to change or move.

Each animation usually includes a background or scene, and one or more components of interest that appear to move in front of the background. A component is a graphic image of an identifiable entity in the time-based media. For example, if the animation is of a deer running through a forest, then the background is the forest, and the component of interest is the deer.

Computer systems have long provided software programs that create and display moving graphic images or animations on the computer screen. On the computer, the image is stored as electronic data, usually as a software graphic file or bitmap of an image. Typically, these software programs provide a way to create and link a series of software graphic images that can be displayed in a sequence of frames to produce an animation. These software programs may be provided as several separate programs, or may be combined as one animation creation, editing, and display application.

For most types of animation, a single frame can usually be extracted without great difficulty. However, the result is a static image of an entire scene. For example, if the animation is of an deer running through a forest, a frame can be extracted that shows the whole frame of a deer frozen in motion against the background of the forest.

One objective of the present invention is to extract a component from a time-based media as a graphic object, separate from the original media, that can be displayed and modified separately. Thus, for the example given above, the objective is to extract the animated deer from the animation as a separate component that can be displayed as a separate animated graphic object on a computer system.

SUMMARY OF THE INVENTION

The invention achieves the above objective by providing systems and methods for converting a component in a time-based component media (TBCM) into a graphic object that may be displayed, manipulated, and modified on a computer system separately from any other components or background in the TBCM.

Typically, the TBCM includes the components as frames in one or more channels. A channel is a series of frames that may be allocated to one component, although this is not required. A frame that includes a component of interest is termed a "component frame."

In one embodiment, the invention includes a memory and a conversion controller in communication with said memory. The memory includes an object data structure, which includes a bitmap entry. The conversion controller determines one or more selected component frames from the TBCM, based on a selected channel and time in the TBCM. The conversion controller converts one or more selected component frames to one or more bitmaps that are stored in the bitmap entry in the object data structure.

In a further aspect of the invention, the object data structure also includes conversion information associated with the one or more bitmaps. The conversion information is stored in the object data structure by the conversion controller. The conversion information is related to the channel and time of the one or more selected component frames in the TBCM.

In one embodiment, the invention is understood as a method for converting components in a TBCM into separate graphic objects. The method includes selecting one or more component frames corresponding to a specific channel and time in the TBCM, converting one or more selected component frames to one or more bitmaps, and storing the bitmaps in one or more bitmap entries in an object data structure.

In one aspect, the method additionally includes the step of storing, in association with the bitmap entry in the object data structure, conversion information regarding the specific channel and time of the selected component frames in the TBCM.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

DETAILED DESCRIPTION OF THE INVENTION

The illustrated embodiments of the invention features systems and methods for the conversion of a component of a time-based component media (TBCM) to a graphic object that can be displayed on a computer display separately from the TBCM. Typically, the TBCM includes a series of frames including one or more components, also termed component frames.

Figure 1:
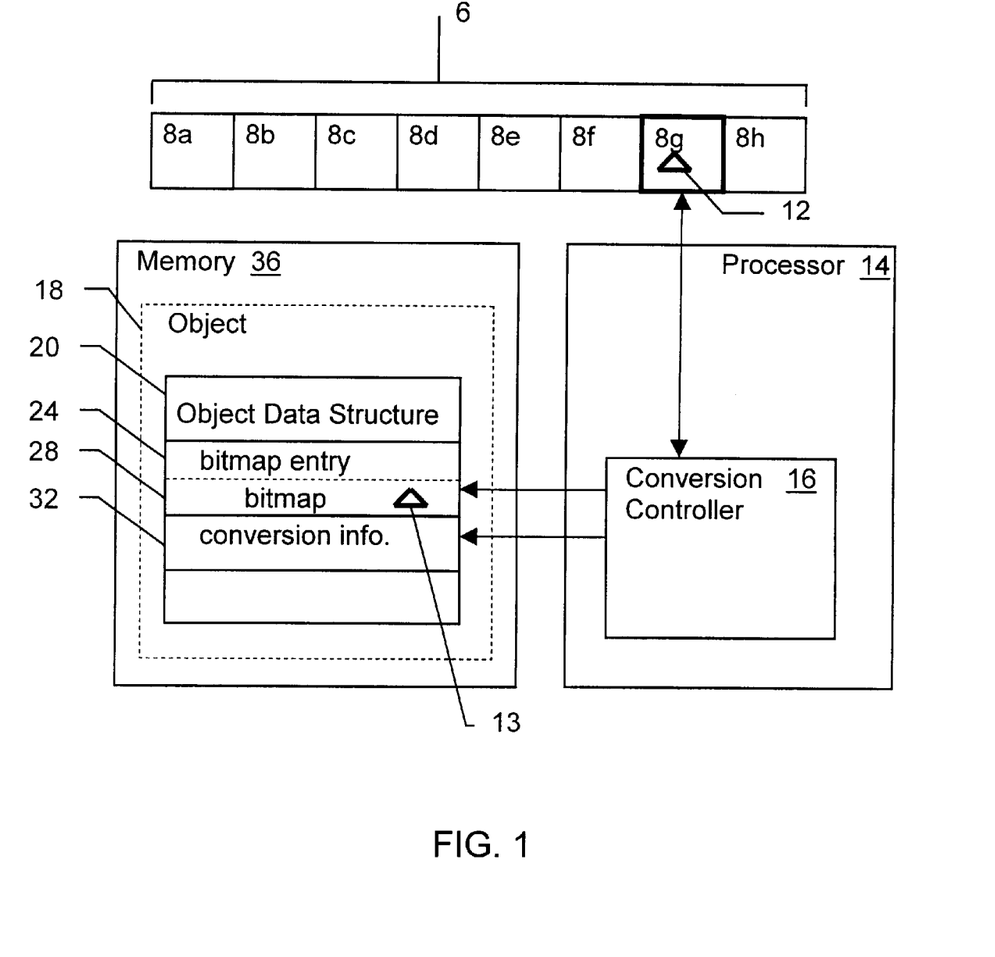
FIG. 1 is a high level functional block diagram of an embodiment of the invention.

FIG. 1 depicts a high level functional block diagram of an embodiment of the invention that includes a channel 6 of a TBCM, a processor 14, a conversion controller 16 that executes on the processor 14, and a memory 36 in communication with the processor 14. The channel 6 is a series of frames intended to be displayed in sequence in a TBCM. The channel 6 shown in FIG. 1 includes a series of component frames, shown generally as 8, and a selected component frame 8g that includes a component of interest 12. The memory 36 stores an object 18 including an object data structure 20, which includes a bitmap entry 24 and conversion information 32. In FIG. 1, the bitmap entry 24 includes a bitmap 28, which includes a converted component 13 which is a copy of the component 12 in the selected component frame 8g.

The TBCM can have one or more channels 6. One channel 6 may provide a scene or setting, such as a forest, that serves as a background for other graphic images or components 12 in other channels 6. One or more of these other channels 6 provide one or more of the components 12 that may move in front of the background. Each frame 8 with a component 12 indicates a position for that component 12 relative to the background. Typically, with each successive frame in one channel 6, the component 12 changes its position relative to the background. Thus, over a series of component frames 8 in one channel 6, the component 12 continues to change position relative to a background scene or display. In the final TBCM, the channel 6 with the component 12 is visually overlaid over a background channel (not shown), thus resulting in movement of the component 12 relative to the background. The channels 6 are stored on a data storage device or storage medium, such as a hard disk, CD ROM disk, or any other suitable media for storing electronic data (not shown in FIG. 1).

The selected component frame 8g is one that has been selected because it includes a component 12 of interest. Typically, a user of the invention, that is, an object designer, makes this selection. Referring to FIG. 1, only one component frame 8g is shown as selected, but more than one component frame 8 may be selected for conversion, if the object designer so desires. In one embodiment, the object designer makes an overall selection of all channels 6 which are then processed by the conversion controller to determine if they include components 12 that can be extracted from the TBCM. The object designer then selects one or more components 12 to be converted.

In one embodiment, the processor 14 is a digital data processor. Alternatively, the processor 14 is a hard-wired device such as an ASIC (application specific integrated circuit), or other suitable hard-wired processor device.

In one embodiment, the conversion controller 16 is a software controller executing on the processor 14 that converts a selected component frame 8g into a bitmap 28 to be stored in the object data structure 20 (to be discussed in more detail later).

The conversion controller 16 can be implemented as a software program, an application, a software object, or other software implementation. In one embodiment, the conversion controller 16 is a software program or application stored on data storage device or storage medium, such as a hard disk or CD ROM disk, or any other suitable storage medium. In another embodiment the program for the conversion controller 16 is stored in ROM, such as EEPROM (electrically erasable programmable read-only memory).

In one embodiment, the conversion controller 16 provides the capability to select channels 6 and component frames 8. As shown in FIG. 1 the object designer uses the conversion controller 16 to select a component frame 8g to be converted to an object 18.

The memory 36 is a memory for use with the processor 14. In one embodiment, the memory 36 is a RAM (random access memory) device such as used with computer systems and digital data processors. The memory 36 can be implemented as any type of RAM device usable with digital computer systems. In one embodiment the memory 36 is implemented as one or more integrated circuit chips.

An object 18 is a software entity executed by the processor 14. An object 18 can be one executable file, or the object 18 can be implemented as part of a larger executable file containing several objects 18. In some cases, the object 18 can be implemented in several related executable files on the processor 14, but the object 18 maintains its identity as a software entity. The object 18 is a software object, which in one embodiment is based on an object oriented programming language and/or system, such as C++, Visual C++, Visual Basic, Smalltalk, Java, or Java Beans.

The object 18 includes an object data structure 20, which includes data and information about the object 18. The object data structure 20 includes a bitmap entry 24 that includes one or more bitmaps 28. Each bitmap 28 is the result of a conversion of a selected component frame 8 performed by the conversion controller 16. For example, in FIG. 1 the bitmap 28 includes a converted component 13 that is a copy of the component 12 in the selected component frame 8g. The bitmap 28 is based on any commonly used bitmap storage format used to store graphic images electronically. In one embodiment, the bitmap 28 can also be any graphic storage format commonly used with computer systems, including graphic metafiles, vector formats or command-based graphic storage formats.

In one embodiment, the object data structure 20 includes conversion information 32 related to the selected component frame 8g and the component 12. The conversion information 32 includes information relating to the channel 6 and the time of the selected component frame 8g in the TBCM. The conversion information 32 will be discussed in more detail later.

Figure 2:
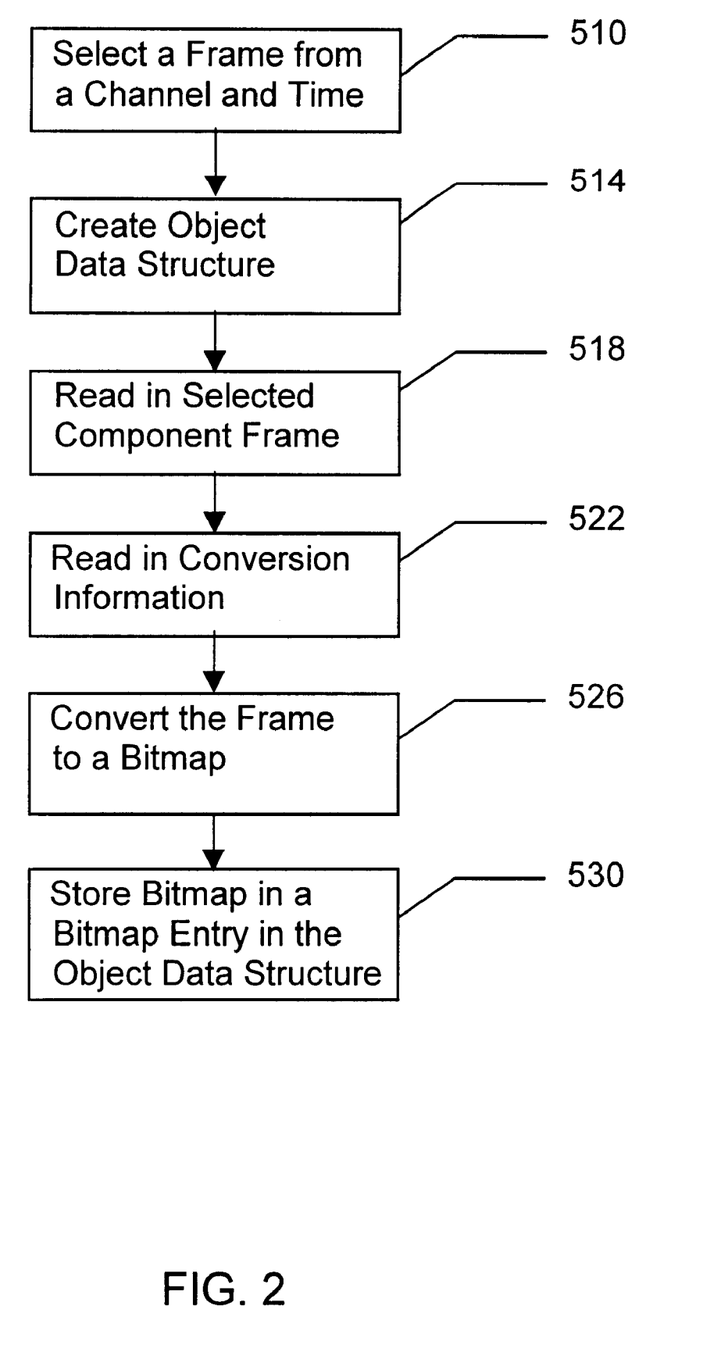
FIG. 2 is a flow chart of one embodiment of the component frame conversion process for the embodiment of the invention depicted in FIG. 1.

FIG. 2 shows a flow chart of one embodiment of the component frame conversion process for the embodiment of the invention depicted in FIG. 1. First, a component frame 8 is selected from the channel 6 (step 510). For example, as shown in FIG. 1, the component frame 8g is selected by an object designer who selects one or more component frames 8 that include a component 12 of interest to the object designer. For an animated scene showing a deer running through a forest, the object designer may select the deer as the component 12 of interest and select one or more component frames 8 that include images of the deer.

The conversion controller 16 creates an object data structure 20 to receive a bitmap 28 (step 514). The conversion controller 16 then reads the selected component frame 8g from the channel 6 based on the selection made by the object designer (step 518). In one embodiment, the conversion controller 16 reads the selected component frame 8g from a database on a storage medium where the channel 6 and component frames 8 are stored. In one embodiment, the conversion controller 16 also reads in conversion information 32 associated with the selected component frame 8g from the database storing the channel 6 and component frames 8 (step 522). The conversion controller 16 then converts the component 12 from the selected component frame 8g into a bitmap 28 that represents the component 12 (step 526). In one embodiment, the conversion involves copying the component 12 bitmap into a bitmap format suitable for storage in the object data structure 20. The conversion controller 16 then stores the converted bitmap 28 including a converted component 13 in a bitmap entry 24 in the object data structure 20 (step 530). In one embodiment, the conversion controller 16 stores the conversion information 32 obtained earlier from the channel 6 and the selected component frame 8g in the object data structure 20.

Figure 3:
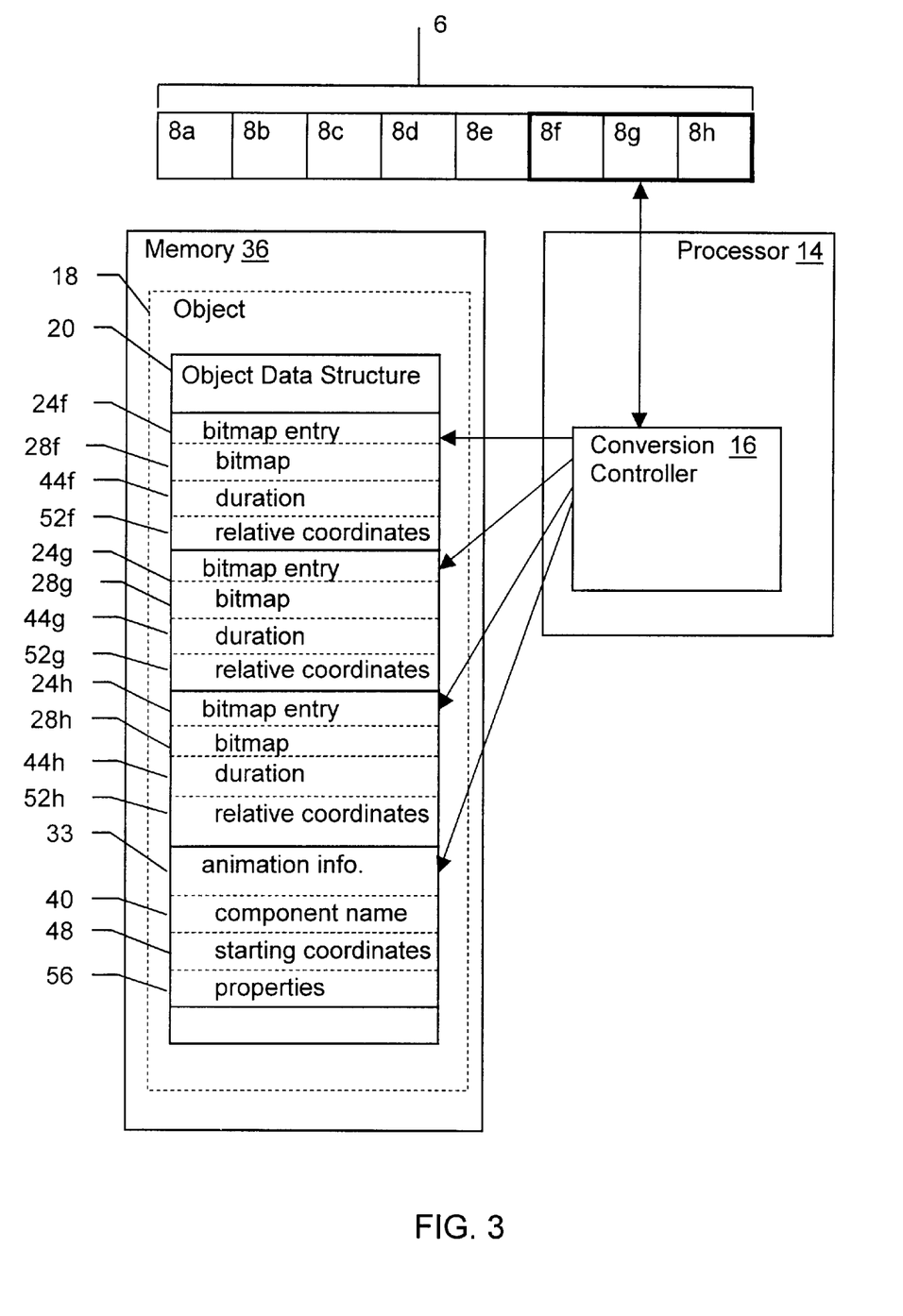
FIG. 3 is a high level functional block diagram of an embodiment of the invention depicting several converted bitmaps and conversion information.

FIG. 3 is a high level functional block diagram of an embodiment of the invention depicting several converted bitmaps and detailed conversion information. FIG. 3 depicts a channel 6, selected component frames 8f, 8g, and 8h, a processor 14, a conversion controller 16, a memory 36, an object 18, and an object data structure 20. The object data structure 20 includes bitmap entries 24f, 24g, 24h including bitmaps 28f, 28g, 28h corresponding to component frames 8f, 8g, 8h.

In FIG. 3, the object designer has selected three component frames 8f, 8g, 8h to be converted to an object 20. The object designer is not required to select three component frames 8f, 8g, 8h, but can select one or more component frames 8 from the channel 6, or select all of the component frames 8 in the channel 6. In the example shown in FIG. 3, the conversion controller 16 reads the component frames 8f, 8g, 8h selected and converts them to bitmaps 28f, 28g, 28h that include the converted components 13 copied from the components 12 (see FIG. 1) in the selected component frames 8f, 8g, 8h. In this process, the conversion controller 16 generally follows the steps illustrated in FIG. 2.

The object data structure 20 includes conversion information 32 including a component name 40, duration 44, starting coordinates of the animation 48, relative coordinates based on the starting coordinates 52, and object properties 56. The component name 40 is the name of the component 12 and may be based on the name that the component had assigned to it previously by the creator of the TBCM. Alternatively, the component name 40 is a new name that is assigned to it by the object designer, or is a name determined by the conversion controller 16. The component name 40 is stored as part of the animation information 33 in the object data structure.

The duration values 44f, 44g, 44h indicate the amount of time that each bitmap 28f, 28g, 28h is to be displayed in the animated object 18, based on the duration for each selected component frame 8f, 8g, 8h in the original TBCM that the bitmaps 28f, 28g, 28h were converted from. The duration values 44f, 44g, 44h are stored with the bitmaps 28f, 28g, 28h.

The starting coordinates of the first frame of the channel 6 are established in the TBCM based on a background or scene that the channel is displayed in. These starting coordinates are then used in calculating the starting coordinates of the animation 48 for the sequence of converted bitmaps 28f, 28g, and 28h included in an animated object 18. The starting coordinates of the animation 48 are set relative to a scene that the animated object 18 will be displayed in. The scene is itself a large bitmap (even if only a white background) typically displayed on a computer screen that includes the converted bitmaps 28f, 28g, 28h when an animated object 18 is displaying its animation based on those bitmaps 28f, 28g, 28h. The converted bitmaps 28f, 28g, 28h are usually smaller than the bitmap of the scene. The starting coordinates 48 are stored with the animation information 33.

The relative coordinates 52f, 52g, 52h are derived from the coordinates in the TBCM for the selected component frames 8f, 8g, 8h. Typically, the component frames 8f, 8g, 8h change position as the component 12 moves in the TBCM, and the relative coordinates 52f, 52g, 52h are based on this movement. The relative coordinates 52f, 52g, 52h are set relative to the starting coordinates of the animation 48 and are used in determining the relative positions of the converted bitmaps 28f, 28g, and 28h in the animation. The relative coordinates are stored with the bitmaps 28f, 28g, 28h.

The properties information 56 provide other information on the properties of the converted bitmaps 28f, 28g, and 28h. The properties information 56 is stored with the animation information 33. The properties information 56 can include the effect type of the bitmaps 28f, 28g, 28h, such as transparent, opaque, or ghosted, and the scale, such as 100% size, 120% size, or other sizes. In a further embodiment, the properties information 56 includes any other additional properties suitable for use with an animation.

In one embodiment, the conversion information 32 can include z-order information (not shown). The z-order information indicates the relative position of the component 12 on the depth or z-axis (that is, closer or farther away from the viewer of the TBCM) compared to other components 12 in the TBCM. The z-order information is stored in the conversion information 32 for a group of converted bitmaps as a whole. Assume the bitmaps 28f, 28g, 28h include a deer component to be displayed in front of a background forest. The z-order information, which places the deer in front of the background forest, will be the same for all of the bitmaps 28f, 28g, 28h.

Figure 4:
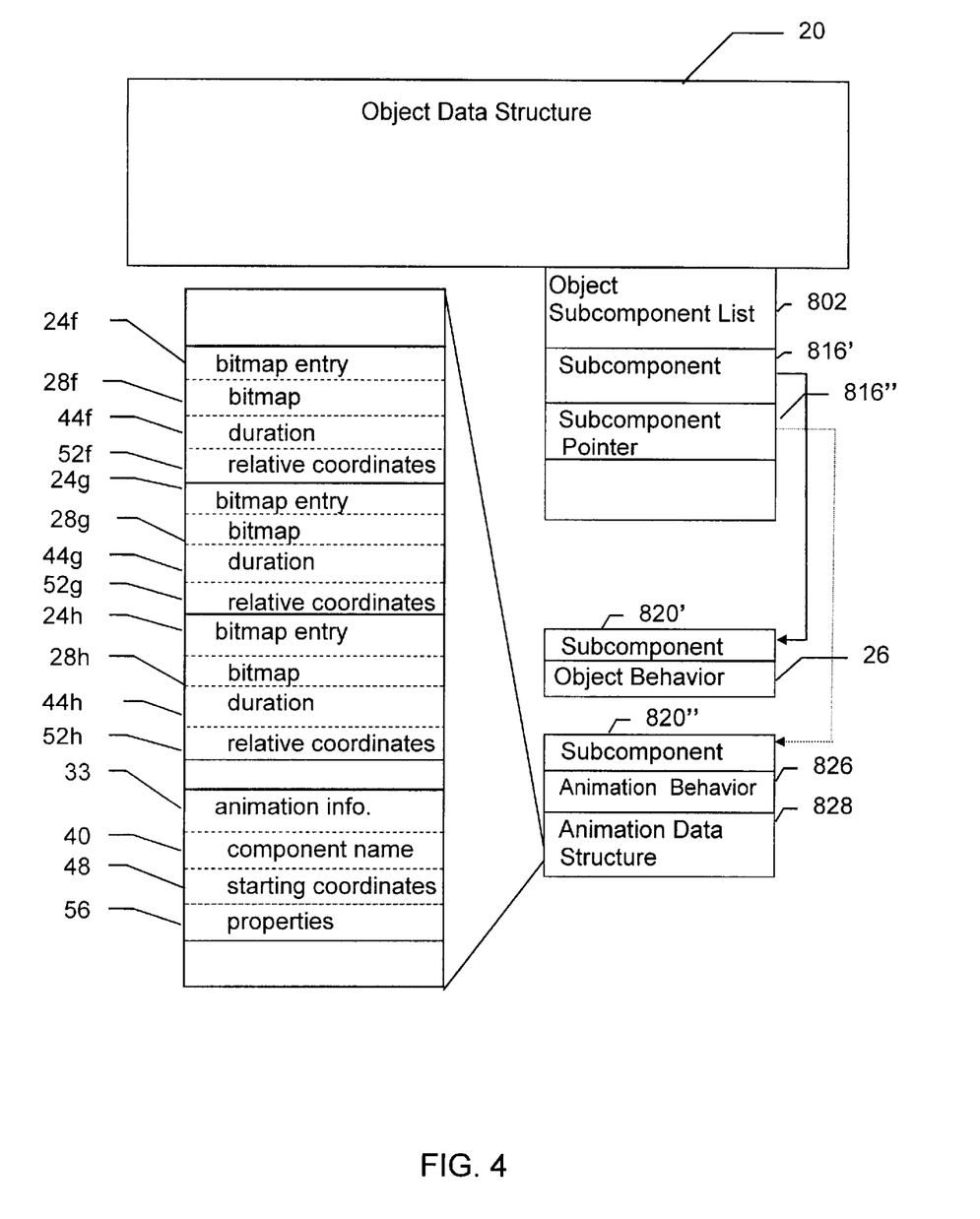
FIG. 4 is a block diagram of one embodiment of an object data structure depicting an animation data structure in an object subcomponent list.

FIG. 4 is a block diagram of one embodiment of an object data structure 20 depicting animation behavior 826 and associated animation data 828 in an object subcomponent list 802. In comparison to FIG. 3, the embodiment of the object data structure 20 shown in FIG. 4 includes an additional object subcomponent list 802 that provides a list of object behaviors 26 associated with the object 18.

The object subcomponent list 802 includes object subcomponent pointers, shown generically as 816, which point to object subcomponents, shown generically as 820. In one embodiment, each object subcomponent 820 includes an object behavior 26, such as the animation behavior 826 associated with subcomponent 820". An object behavior 26 is a behavior exhibited in association with an object 18, such as an activity that occurs and/or a media that is played when an object 18 is activated. The object can be activated by an end user of the object 18 or by some event (for example a message from another object 18). For example, an object behavior 26 can be an audio behavior. When an end user activates an object 18, then the object 18 activates the audio behavior in the object subcomponent list 802, which in turn plays back an audio file that the object designer previously associated with the audio behavior.

In one embodiment, the object data structure 20 includes a default or initial image or bitmap that is displayed as a default on a computer screen or display when the user has not yet provided any input to the object 18.

FIG. 4 shows an object subcomponent pointer 816" pointing to an object subcomponent 820" that includes an animation behavior 826. The animation behavior 826 displays a series of graphic images resulting in an animation displayed to the end user. The animation behavior 826 includes an animation data structure 828, which includes a series of graphic images and additional data, such as the timing and duration of their display.

In the example shown in FIG. 4, the animation data structure 828 includes data from a conversion of a component 12 from three selected component frames (8*f*, 8*g*, 8*h* as shown in FIG. 3). The animation data structure 828 in FIG. 4 includes the bitmap entries 24*f*, 24*g*, 24*h*, bitmaps 28*f*, 28*g*, 28*h*, duration 44*f*, 44*g*, 44*h*, and relative coordinates 52*f*, 52*g*, 52*h*. The animation information 33 includes a component name 40, starting coordinates of the channel 48, and properties information 56, as described previously for FIG. 3

An object designer can modify the animation behavior 826 using an animation editor, which can result in changes to the data in the animation data structure 828. An object designer can use the animation editor to correct the alignment of bitmaps 28 in the animation. Alignment, or registration, refers to the way multiple images work together to create an animation that proceeds in a visually logical way. When an object 18 is first displayed, it will present a default or initial image. This initial image may be a copy of the first bitmap 28*f* that was converted, or another image altogether. When the object 18 is activated by an end user, and an animation is displayed, the animation images may not be aligned with the initial image, and the animation starts with a "jerk". An object designer can use an animation editor to move the first bitmap 28*f* to align with the default or initial image that is displayed for the object 18. To accomplish this, the animation editor changes the starting coordinates 48 in the animation data structure 828 of the sequence of converted bitmaps 28. The object designer can also adjust the alignment of the individual frames in the animation behavior 826 if need be (in effect, changing the relative position of the bitmaps 28 by changing their relative coordinates 52).

The object designer can also use the animation editor to change the order of the images (bitmaps 28) in the animation, delete images, and/or add new images to the animation. The new images can be added before, after, or in between the images converted from the TBCM. The animation editor accomplishes this by changing the relative position of the bitmaps 28 in the animation data structure 828.

Figure 8:
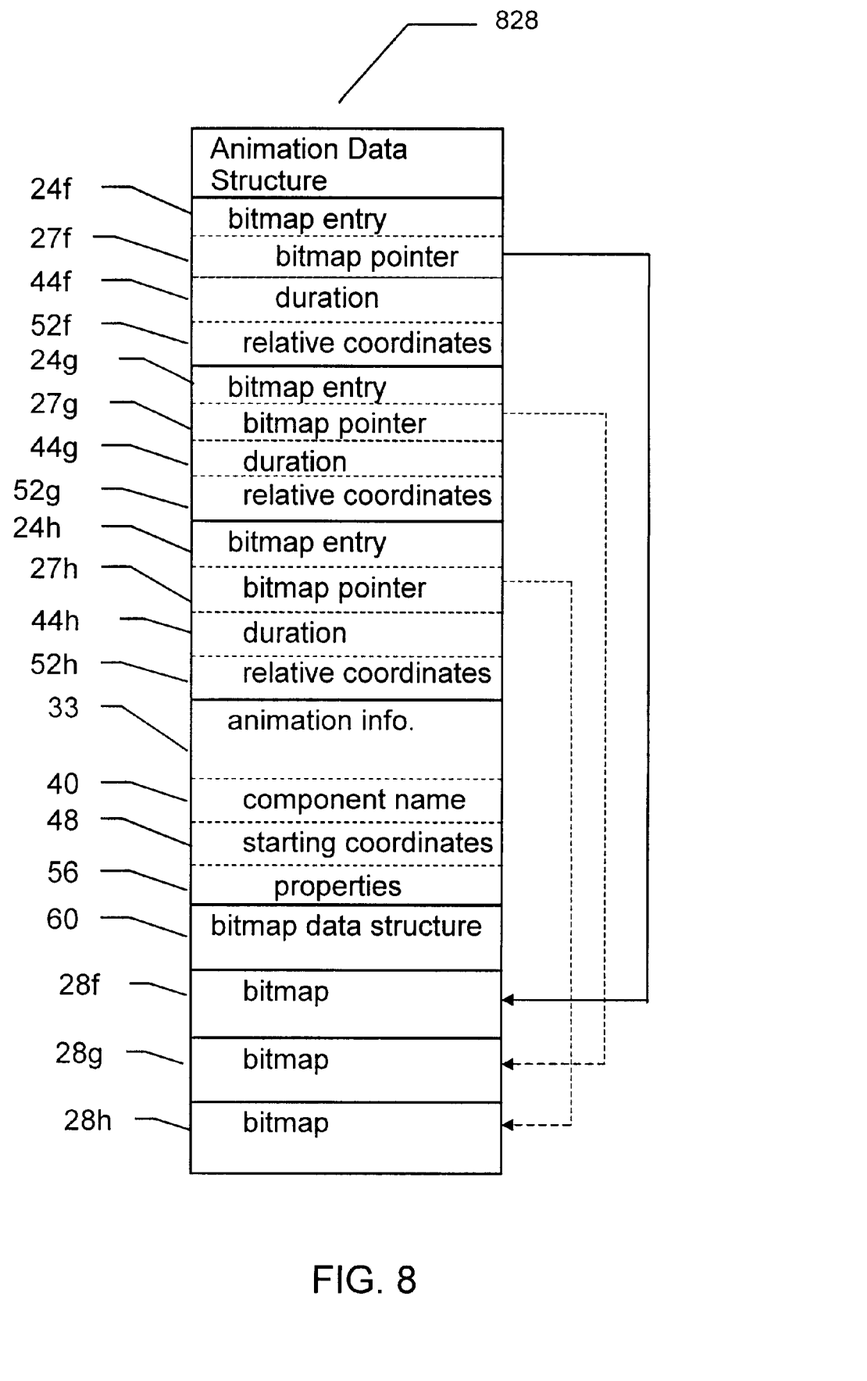
FIG. 8 depicts a file structure used with one embodiment of the invention showing an animation data structure, bitmap data structure, bitmap pointers, and bitmaps.

In one embodiment, the bitmaps 28 are in a separate data structure or database and linked by bitmap pointers 27 to the animation data structure 828 (see FIG. 8). In this case, the animation editor can change the displayed sequence of the bitmaps 28 by changing the sequence of the bitmap pointers 27 and insert new bitmaps 28 by inserting their bitmap pointers 27 into the existing list of bitmap pointers 27.

The object designer can also use the animation editor to change the time duration 44 for a bitmap 28. The object designer can specify a higher or lower number for the duration 44 that is used to increase or decrease the amount of time that bitmap 28 is displayed on the screen. The animation editor uses the value provided by the object designer to set the duration values 44 in the animation data structures 828. In one embodiment, the object designer sets the duration value 44 by selecting the number of milliseconds that each bitmap 28 will be displayed. However, this value is relative to an overall speed value for the animation as a whole. The object designer can also adjust this overall speed value. Then the actual time that a frame is displayed is determined from the duration value 44 and the overall speed value.

The bitmaps 28 that were converted can also be added as a sequence to another object 18 or included in an existing animation behavior 826 in another object 18. In one embodiment, the invention includes an object maker program, which displays interactive objects 18 that can be viewed by the object designer and executes on the processor 14 (see FIG. 1). An object viewer is also implemented which allows the end user to view objects 18, but not to design or modify them. Examples of an object maker and object viewer program are ThingMaker™ and ThingViewer™ "from LLC of Newton, Mass").

As is true for many object oriented system, each object 18 inherits methods from a base object class. These include methods for inserting subcomponent pointers 816 into the object data structure 20. When the object designer assigns or copies an object behavior 26 to an object 18, then the object 18 inserts a pointer for that object behavior 26 in the list of subcomponent pointers 816 for that object 18. For example, the object designer can use the object maker user interface to copy or add an animation behavior 826 to an object 18. As illustrated in the example shown in FIG. 4, the object maker software adds a subcomponent pointer 816" to the object subcomponent list 802 that points to an object subcomponent 820" that includes the animation behavior 826.

The animation behavior 826 can be used with other object behaviors 26 that are exhibited in association with an object 18, such as when an audio behavior plays an audio file when an object 18 is activated. In this situation, each object behavior 26 is a subcomponent 820 in the object subcomponent list 802. When a user activates the object 18, then the object 18 activates each subcomponent 820 in the list. Conversely, when the user deactivates an object 18, or when the object 18 returns to a default state, then the object 18 deactivates each subcomponent 820 in the list 802. A subcomponent 820 can terminate of its own accord, for example, when an animation behavior 826 completes an animation. Conversely, an object designer can specify that the animation behavior 826 repeat the animation sequence (the display of a sequence of bitmaps 28) in a loop.

Other object behaviors 26 can include a layer behavior, swap behavior, hide/show behavior, location behavior, collision behavior, and other behaviors for use with a graphic object 18 or image displayed on a computer screen.

The layer behavior is used to change the order in which objects 18 are drawn on a screen, causing some objects 18 to appear in front or behind other objects 18. In one embodiment, the layer behavior utilizes the z-order information obtained by the conversion controller 16 from the TBCM.

The swap behavior is used to change the location, visibility, and layer properties of two objects 18. The hide/show behavior is used to choose whether an object 18 is visible or not. The swap behavior and hide/show behaviors may be used if an object 18 moves into the space of another object 18 (see also the collision behavior discussed below).

The location behavior is used to cause an object 18 to move to another location on the screen. For example, if an object 18 is activated, an object designer can design the object 18 to move to another position in a screen, and then an animation behavior 826 causes an animation to be displayed.

The collision behavior is used to indicate what other behaviors 26 will occur when two objects 18 collide on a screen. Thus if two objects 18 that display graphic images of airplanes collide, then the collision behavior can invoke an animation behavior 826 showing people parachuting out of the airplanes.

The object behaviors 26 can be used with the animation behavior 826 to create complex scenes, in which animated objects 18 may move in front or behind one another (layer behavior), collide with each other (collision behavior), and engage in other complex, interactive behaviors that extend beyond that shown by the animation behavior 826 of a single object 18.

In one embodiment, these object behaviors 26, including animation behaviors 826, are included in a subcomponent list 802. The object designer determines in what order the subcomponents 820 will be activated when an end user activates the object 18.

Figure 5:
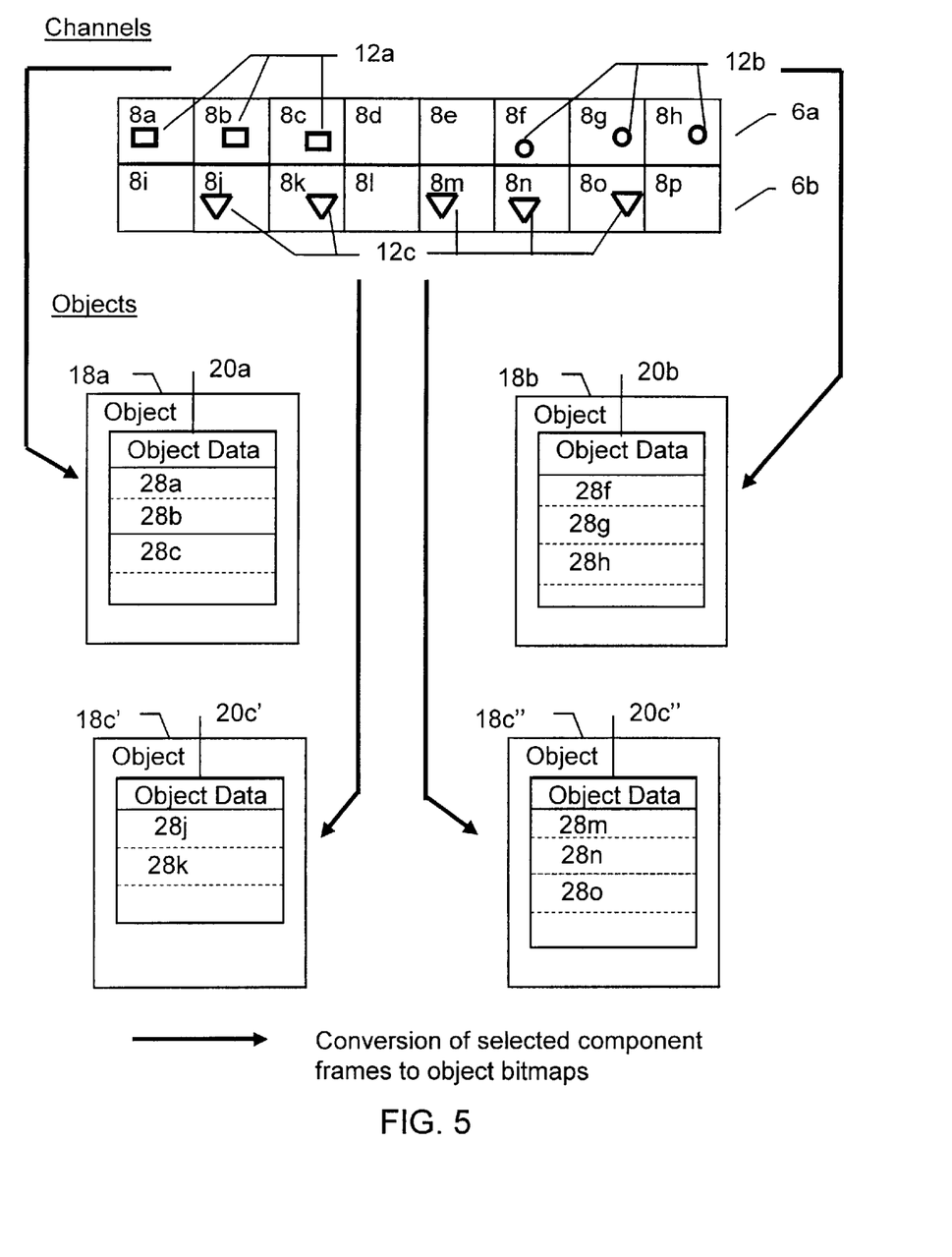
FIG. 5 is a block diagram depicting the conversion process for one embodiment of the invention for several components in selected component frames and the resultant data structures.

FIG. 5 is a block diagram depicting the conversion process for several components 12a, 12b, 12c in selected component frames 8a, 8b, 8c, 8f, 8g, 8h, 8j, 8k, 8m, 8n, 8o for one embodiment of the invention. FIG. 5 only shows the bitmaps 28 but not the other data in the object data structures 20. In addition, it should be understood that the bitmaps 28 in the object data structures in FIG. 5 may be replaced by bitmap pointers 27 (see FIG. 8) in a further embodiment of the invention.

FIG. 5 shows channel 6a, which includes one component 12a in component frames 8a, 8b, and 8c, blank frames 8d and 8e, and a second component 12b in component frames 8f, 8g, 8h. Channel 6b includes a third component 12c in component frames 8j, 8k, 8m, 8n, 8o and blank frames 8i, 8l, 8p. If an entire channel, such as channel 6a, is selected, then the components 12a and 12b in the channel 6a will be recognized by the conversion controller 16 as two separate components 12a and 12b because they are separated by blank frames 8d and 8e. The components 12a and 12b are converted into two objects 18a and 18b. The conversion controller 16 converts the selected component frames 8a, 8b, and 8c having component 12a into bitmaps 28a, 28b, 28c in an object data structure 20a for object 18a. The conversion controller 16 converts the selected component frames 8f, 8g, 8h having component 12b into bitmaps 28f, 28g, 28h in an object data structure 20b for another object 18b.

Channel 6b has two groups of component frames 8 with the same component 12c, but separated by a blank component frame 8l between the two groups. If channel 6b is selected, then the conversion controller 16 converts the first group of selected component frames 8j, 8k having component 12c into bitmaps 28j, 28k in an object data structure 20c' for object 18c', and converts the second group of selected component frames 8m, 8n, 8o having component 12c into bitmaps 28m, 28n, 28o in an object data structure 20c" for a second object 18c", because frames 8j, 8k and 8m, 8n, 8o are separated by a blank frame 8l.

Figure 6:
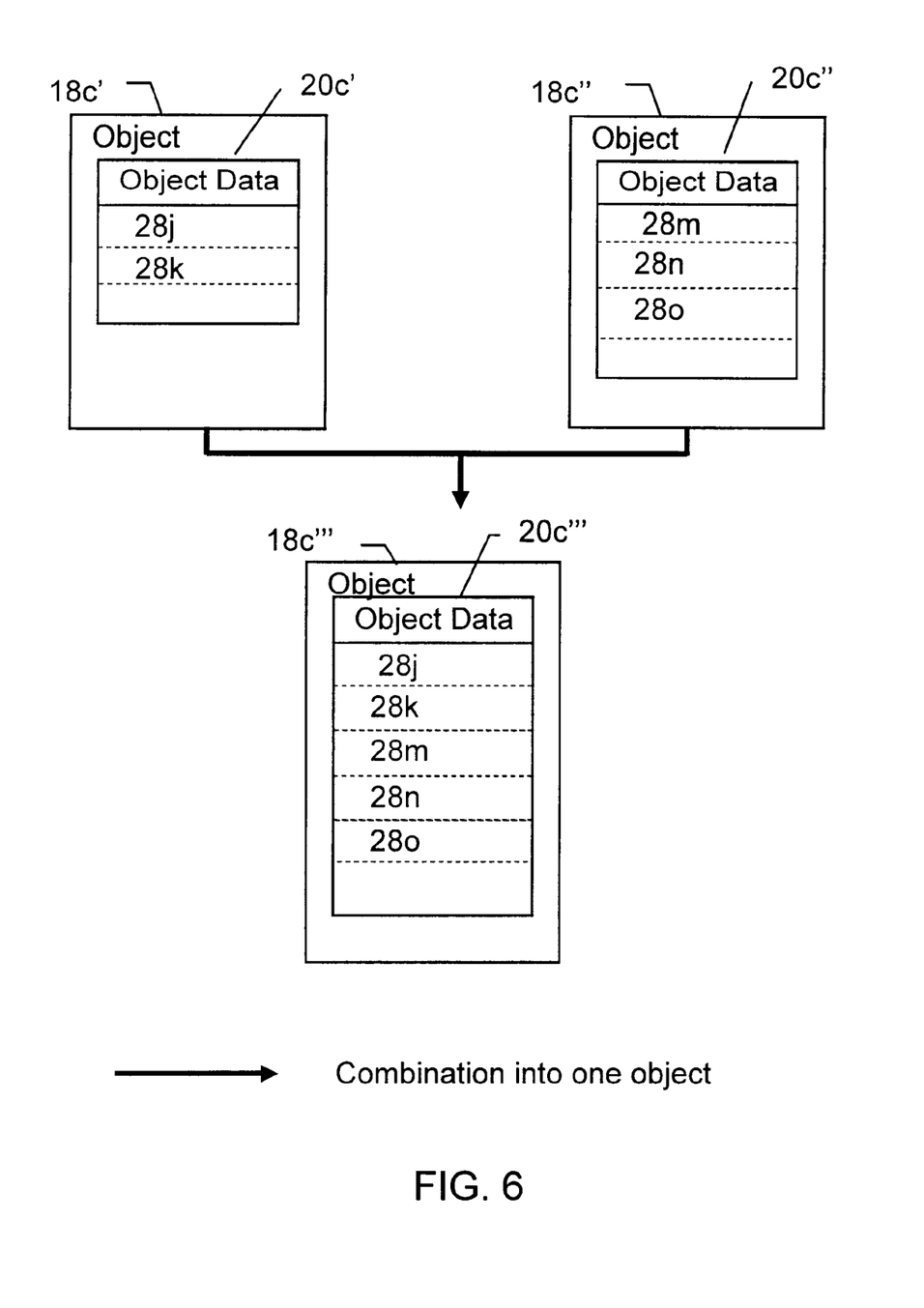
FIG. 6 is a is a block diagram depicting the combination process for two objects for the embodiment of the invention shown in FIG. 5.

After the objects 18c' and 18c" have been created, as shown in FIG. 5, an object designer can combine the two objects 18c' and 18c" into one object 18c''', as depicted in FIG. 6. FIG. 6 shows an object 18c' having bitmaps 28j, 28k representing component 12c and object 18c" having bitmaps 28m, 28n, 28o also representing the component 12c (see FIG. 5). In one embodiment of the invention, the object designer uses an object combinator, such as an object combining software application or ASIC, to combine the objects 18c' and 18c". In one embodiment of the invention, the object designer uses an animation editor to combine all the bitmaps 28j, 28k, 28m, 28n, 28o representing the same component 12c in one object data structure 20c''' in one object 18c''' (see FIG. 6).

Figure 7:
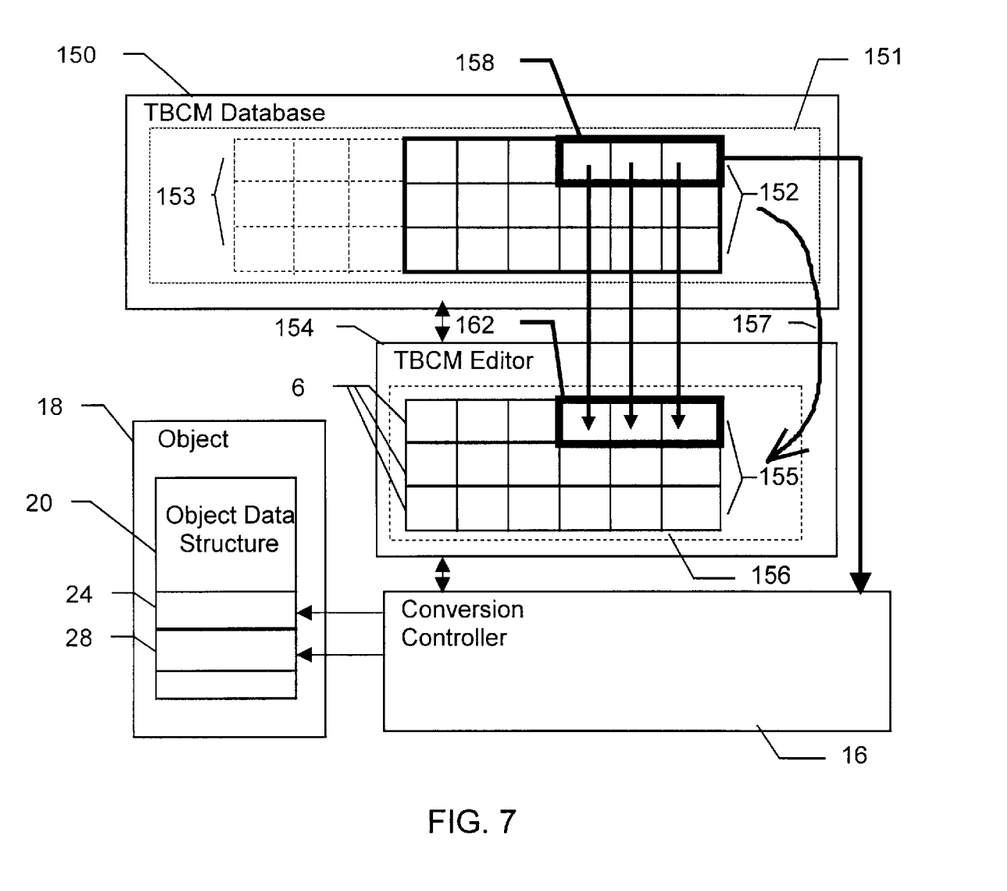
FIG. 7 is a block diagram depicting a TBCM database, TBCM editor, conversion controller, object, and object data structure for one embodiment of the invention.

FIG. 7 shows a block diagram showing a TBCM database 150, TBCM editor 154, conversion controller 16, object 18, and object data structure 20. The TBCM editor 154 is a software program that a user can use to create and edit a TBCM. In one embodiment, the TBCM editor 154 executes on the processor 14. One example of a TBCM editor is Macromedia® Director® from Macromedia, Inc., San Francisco, Calif. The TBCM database 150 includes a complete set of stored component frames 151 for a TBCM, such an animation. The TBCM editor 154 displays the channels 6 in a TBCM, as well as representations of the frames 155 in the TBCM. As shown in FIG. 7, the TBCM includes one group of component frame representations 162 that an object designer has selected for conversion to an object 18. The component frames 8 themselves are stored in a TBCM database 150, which includes a group of selected component frames 158 that corresponds to the group of frame representations 162 selected in the TBCM editor 154. In FIG. 7 the stored component frames 152 are shown in an array corresponding to the array of frame representations 155 displayed in the TBCM editor 154. The curved arrow 157 indicates the mapping of the stored component frames 152 to the displayed frame representations 155 in the TBCM editor 154. Additional component frames 153 are stored in the TBCM database 150 but are not displayed in the TBCM editor 154, because the TBCM editor 154 cannot display the complete set of stored component frames 151 if there are too many of them.

The stored component frames 151 can be stored in any commonly used format used for storing graphic images on a data storage device or storage medium, such as in a database or in one or more files. The stored component frames 151 are not required to be stored in an array, as shown in FIG. 7. The storage medium can be any commonly used storage medium for storing electronic data, such as a hard disk, computer tape, video tape, CD-ROM disk, or other kinds of suitable disks or storage media.

The conversion controller 16 is used with the TBCM editor 154 to complete the conversion process. In one embodiment, the conversion controller 16 is a separate software program that is recognized by and works with Macromedia® Director®. Such a program is referred to as a Macromedia® Xtra™. One example of this type of conversion controller 16 is "ThingConverter™ from Thing World.Com".

In one embodiment, the object designer invokes the TBCM editor 154 to display the score display 156 for the TBCM using the Macromedia® Director® application. The score display 156 shows the channels 6 with representations of the frames 155 and audio files that may be associated with the animation. Typically, each channel 6 includes at least one component 12, also termed a sprite, cast member, or element of the TBCM. The object designer then selects a group of frame representations 162 from channels 6 displayed in the score display 156 that are to be converted.

The object designer then invokes the conversion controller 16 which provides a list of components 12 that can be converted. Each component 12 is given a name in the conversion controller 16 based on the name of the first cast member in the selected group of frame representations 162. If several different components 12 were selected, such as when two or more channels 6 are selected, then the conversion controller 16 displays all the components 12 that can be converted. The object designer then indicates that the components are to be exported, which means that the components 12 will be converted and exported from the conversion controller 16 as objects 18.

When the object designer has made this request for the components 12 to be exported, the conversion controller 16 uses a Macromedia® API (application programming interface) to locate the selected frames. For example, as shown in FIG. 7, the conversion controller uses the API to locate the group of selected frames 158 in the TBCM database 150 that correspond to the group of frame representations 162 selected by the object designer in the score display 156. The conversion controller 16 then reads the selected component frames 158 from the TBCM database 150 and converts the selected component frames 158 into an object 18. In one embodiment, the conversion controller 16 uses the object data structures 20 and the process described for FIG. 5 when making the conversion.

In one embodiment, the conversion controller 16 exports the converted objects 18 in a conversion file or an exported file that can be displayed. If several components 12 were converted, then the conversion or exported file can be opened to display the converted objects 18 in a scene (also termed a "stage"). Thus, the conversion or exported file of objects 18 can be termed a scene file. The object designer can then open and modify the objects 18 in the scene file by using an object maker program. In one embodiment of the invention using the "ThingMaker™" program, the scene file is a ThingMaker™ scene file. In one embodiment of the invention, the object maker program also functions as an object combinator that can be used to combine objects 18.

Referring to FIGS. 3 and 7, the conversion controller 16 obtains additional conversion information 32 from the TBCM editor 156. This conversion information 32 is then stored in the object data structure 20 (see FIG. 3) when the component is exported as an object 18. In one embodiment, the conversion information 32 is stored in an animation data structure 828 (see FIG. 4). The conversion controller 16 uses the position relative to the TBCM of the first component frame 8 in a group of selected component frames 158 to establish starting coordinates 48 relative to the scene in the converted animation. The starting coordinates 48 indicate where the first converted bitmap 28 in the object 18 will be displayed in a scene file. The conversion controller 16 uses information from the TBCM editor 154 to establish the relative position of the component frames in the group of selected component frames 158 relative to the TBCM. The conversion controller 16 then stores this information in the object data structure 20 as the relative coordinates 52 of the converted bitmaps 28.

In one embodiment, the TBCM editor may provide absolute coordinates for each component frame 8 in the TBCM. The conversion controller 16 sets starting coordinates 48 relative to the converted animation for the first bitmap 28 in a scene, based on the absolute coordinate in the TBCM for the first component frame 8 that was selected in a group. The starting coordinates 48 are set in a scene that may include other objects 18 that were converted at the same time from one TBCM. The conversion controller 16 then uses the absolute coordinates in the TBCM to determine relative coordinates 52 for each bitmap 28 in an object 18 as offsets from the starting coordinates 48 for that object 18.

The conversion controller 16 also obtains the duration of each component frame 8 from the TBCM editor 154 and stores this information as the duration values 44 in the object data structure 20. The conversion controller 16 also stores a component name 40 in the object data structure 20, which is obtained from the TBCM editor 154, or is a name provided by the object designer to the conversion controller 16.

In one embodiment, the conversion controller 16 also obtains color information from the TBCM editor 156. The conversion controller 16 uses the color information to do a palette conversion when converting the component 12 to an object 18. In one embodiment, the conversion controller 16 converts the color of a component 12 using a color palette of 256 colors. One of the colors is a transparent color. The component 12 is usually converted as a rectangular bitmap 28, with a component 12 as part of the bitmap 28. For example, a bitmap 28 may have a baseball as a component 12 in the bitmap 28. The area of the bitmap 28 that is not the baseball usually has a transparent color. Then if the baseball if moved over a background, then the end user sees only the baseball, rather than a baseball in a rectangle.

FIG. 8 shows a file for an object 18 including an animation data structure 828 and a bitmap data structure 60 for one embodiment of the invention. In the animation data structure 828, the bitmaps 28f, 28g, 28h are replaced with bitmap pointers 27f, 27g, 27h that point to the bitmaps 28f, 28g, 28h in the separate bitmap data structure 60. In alternate embodiments, the bitmap data structure 60 either is part of the object data structure 20, a separate data structure in a file for the object 18, or in a separate file from the file for the object data structure 20.

In general, in the figures, wherever a bitmap 28 is shown, it can be replaced in further embodiments with a bitmap pointer 27 and bitmap 28 as illustrated in FIG. 8.

The object designer can use the animation editor to change the relative position of the bitmaps 28 by changing the position of the bitmap pointers 27 in the animation data structure 828. In this case, the object designer can use the animation editor to change the sequence of the bitmap pointers 27 and insert new bitmaps 28 by changing or inserting their bitmap pointers 27 in a list of bitmap pointers 27 in the object data structure 20.

In one embodiment, the file shown in FIG. 8 is a conversion or scene file including object data structures 20 that use bitmap pointers 27. The scene file can include a bitmap 28 that is referenced by several different objects 18. In this case, when using a bitmap pointer approach, the scene file need include only one copy of the bitmap 28 that is pointed to by several bitmap pointers 27 in different object data structures 20. The scene file can also include several bitmaps 28, each of which is pointed to by bitmap pointers 27 in one or more object data structures 20. In this way, the size of the scene file is decreased compared to a scene file that must include each bitmap 28 directly in each object data structure 20 that uses that bitmap 28.

Having described the preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An apparatus for converting a component of a time-based component media to an object, said time-based component media comprising at least one channel comprising a plurality of component frames, said apparatus comprising:

a memory comprising an object data structure associated with said object, said object data structure comprising a bitmap entry; and a conversion controller in communication with said memory, wherein said conversion controller determines at least one selected component frame from said plurality of component frames, said at least one selected component frame corresponding to said at least one channel and at least one time in said time-based component media, said conversion controller converting said at least one selected component frame to at least one bitmap and storing said at least one bitmap in said bitmap entry in said object data structure.

2. The apparatus of claim 1 wherein said object data structure further comprises conversion information in association with said at least one bitmap, said conversion information relating to said at least one channel and said at least one time of said at least one selected component frame in said time-based component media, said conversion controller storing said conversion information in said object data structure.

3. The apparatus of claim 2 wherein said conversion information comprises a component name, a duration, starting coordinates of said at least one bitmap, relative coordinates of each of said at least one bitmap based on said starting coordinates, and properties information.

4. The apparatus of claim 1, further comprising at least one object behavior comprising an animation behavior associated with said object and said animation behavior displaying said at least one bitmap.

5. The apparatus of claim 4, wherein said at least one object behavior further comprises at least one of an audio behavior, a layer behavior, a swap behavior, a hide/show behavior, a location behavior, and a collision behavior.

6. The apparatus of claim 4, further comprising an animation editor in communication with said memory, wherein said animation editor is adapted to enable modification of said animation behavior.

7. The apparatus of claim 1 wherein said at least one bitmap comprises a plurality of bitmaps and wherein said apparatus further comprises:

an object combinator;

a first object comprising a first one of said plurality of bitmaps; and a second object comprising a second one of said plurality of bitmaps, wherein said object combinator is adapted to enable the combination of said first object and said second object into a third object, said third object comprising said first one of said plurality of bitmaps and said second one of said plurality of bitmaps.

8. The apparatus of claim 7, wherein said object combinator is an animation editor.

9. The apparatus of claim 1 further comprising a bitmap data structure; wherein said object data structure comprises at least one bitmap pointer, said conversion controller stores said at least one bitmap in said bitmap data structure, and said at least one bitmap pointer links said object data structure to said at least one bitmap.

10. The apparatus of claim 9 further comprising a data storage device, wherein said conversion controller stores said bitmap data structure on said data storage device.

11. The apparatus of claim 10, wherein said data storage device comprises said memory.

12. The apparatus of claim 11 further comprising a conversion file, said conversion file comprising at least one of said object data structure and at least one of said bitmap data structure, wherein said conversion controller stores said conversion file on said data storage device.

13. A method of converting a component of time-based component media to an object comprising the steps of:

selecting at least one component frame corresponding to at least one channel and at least one time in said time-based component media;

converting said at least one selected component frame to at least one bitmap; and storing said at least one bitmap in a bitmap entry in an object data structure.

14. The method of claim 13 further comprising the step of storing, in association with said bitmap entry in said object data structure, conversion information regarding said at least one channel and said at least one time of said at least one selected frame in said time-based component media.

15. The method of claim 14 wherein said conversion information comprises a component name, a duration, starting coordinates of said at least one bitmap, relative coordinates of each of said at least one bitmap based on said starting coordinates, and properties information.

16. The method of claim 13, further comprising the step of animating said object using said at least one bitmap by an animation behavior associated with said object.

17. The method of claim 16, further comprising the step of exhibiting object behaviors by said object.

18. The method of claim 13, further comprising the steps of:

providing an animation behavior associated with said object;

providing an animation editor adapted to enable modification of said animation behavior;

displaying said at least one bitmap by said animation behavior; and modifying said animation behavior by said animation editor.

19. The method of claim 13 further comprising the steps of:

providing a plurality of bitmaps;

providing a first object comprising a first one of said plurality of bitmaps;

providing a second object comprising a second one of said plurality of bitmaps; and combining said first object and said second object into a third object comprising said first one of said plurality of bitmaps and said second one of said plurality of bitmaps.

20. The method of claim 13 further comprising the steps of:

storing said at least one bitmap in a bitmap data structure; and linking said object data structure to said at least one bitmap using at least one bitmap pointer.

21. The method of claim 20 further comprising the step of storing at least one of said object data structure and at least one of said bitmap data structure in a conversion file on a data storage device.

* * * * *